(12) United States Patent
Siminoff

(10) Patent No.: US 9,426,287 B2
(45) Date of Patent: *Aug. 23, 2016

(54) SYSTEM AND METHOD FOR AUTOMATIC CALL SCHEDULING

(71) Applicant: James Siminoff, Palisades Park, CA (US)

(72) Inventor: James Siminoff, Palisades Park, CA (US)

(73) Assignee: James Siminoff, Palisades Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,837

(22) Filed: May 4, 2015

(65) Prior Publication Data

US 2015/0237203 A1     Aug. 20, 2015

Related U.S. Application Data

(63) Continuation of application No. 13/886,710, filed on May 3, 2013, now Pat. No. 9,049,274.

(51) Int. Cl.
*H04M 3/00* (2006.01)
*H04M 3/42* (2006.01)
*H04M 3/432* (2006.01)

(52) U.S. Cl.
CPC .................................. *H04M 3/432* (2013.01)

(58) Field of Classification Search
USPC .................................................... 379/210.01
See application file for complete search history.

(56) References Cited

U.S. PATENT DOCUMENTS

| | | | | |
|---|---|---|---|---|
| 6,212,268 B1* | 4/2001 | Nielsen | ............ | H04M 3/42195 370/352 |
| 6,411,605 B1* | 6/2002 | Vance | ................... | H04L 12/24 370/261 |
| 7,127,053 B1* | 10/2006 | Laljiani | ............ | H04M 3/42195 379/207.03 |
| 7,822,186 B1* | 10/2010 | Boni | ................... | H04M 3/432 379/202.01 |
| 8,897,434 B2* | 11/2014 | Perry | ................... | H04M 3/56 379/202.01 |
| 9,049,274 B2* | 6/2015 | Siminoff | ................. | H04M 3/00 |
| 2004/0198427 A1* | 10/2004 | Kimbell | .............. | H04M 1/1663 455/556.1 |
| 2005/0227680 A1* | 10/2005 | Snowden | ........ | H04M 1/274575 455/416 |
| 2007/0049261 A1* | 3/2007 | Joglekar | ........... | H04M 1/72566 455/416 |
| 2007/0291917 A1* | 12/2007 | Berstis | .............. | H04M 3/42374 379/202.01 |
| 2008/0013706 A1* | 1/2008 | Kelley | ................. | G06Q 10/109 379/202.01 |
| 2014/0329507 A1* | 11/2014 | Siminoff | ................. | H04M 3/00 455/414.1 |

* cited by examiner

*Primary Examiner* — Harry S Hong
(74) *Attorney, Agent, or Firm* — White and Williams LLP

(57) ABSTRACT

A computer system for connecting a user to a scheduled call, including a processor in communication with non-volatile memory and code for receiving a user phone number where the user may be contacted and information allowing access to the user's calendar or email, code for accessing the user's calendar or email and identifying the scheduled call in the user's calendar or email, the scheduled call having information including at least a scheduled call number and a scheduled call time, code for placing a call to the scheduled call number before the scheduled call time, code for placing a call to the user at the user phone number before the scheduled call time, code for confirming the user has answered the call to the user, and code for connecting the call to the user to the call to the scheduled call number.

10 Claims, 6 Drawing Sheets

SYSTEM AND METHOD FOR AUTOMATIC CALL SCHEDULING

CROSS-REFERENCE TO RELATED APPLICATIONS

This application is a Continuation of U.S. Non-provisional application Ser. No. 13/886,710, entitled "System and Method for Automatic Call Scheduling" filed May 3, 2013, the full disclosure of which is incorporated by reference herein in its entirety.

BACKGROUND OF THE INVENTION

Business people and other busy individuals often schedule multiple phone calls throughout a day and may encounter difficulty participating in each scheduled call. For example, a call may continue past a given time slot and may "run over" into a second call, thereby causing the user to be late for the second call. Or, an incoming call or other exigent event may cause the user to forget a call completely. For these and other reasons, there is a need for a system and method that will connect the user with a scheduled call. In one aspect, the system may dial into and connect with a scheduled call, dial the user, and connect with user with the scheduled call.

SUMMARY OF THE INVENTION

A computer system for connecting a user to a scheduled call, including a processor in communication with non-volatile memory, the non-volatile memory including code for receiving a user phone number where the user may be contacted and information allowing access to the user's calendar or email; code for accessing the user's calendar or email and identifying the scheduled call in the user's calendar or email, the scheduled call having information including at least a scheduled call number and a scheduled call time; code for placing a call to the scheduled call number before the scheduled call time; code for placing a call to the user at the user phone number before the scheduled call time; code for confirming the user has answered the call to the user; and code for connecting the call to the user to the call to the scheduled call number.

BRIEF DESCRIPTION OF THE DRAWINGS

The drawings presented herein are for the purposes of illustration, the invention is not limited to the precise arrangements and instrumentalities shown.

DETAILED DESCRIPTION OF THE INVENTION

Figure 1:
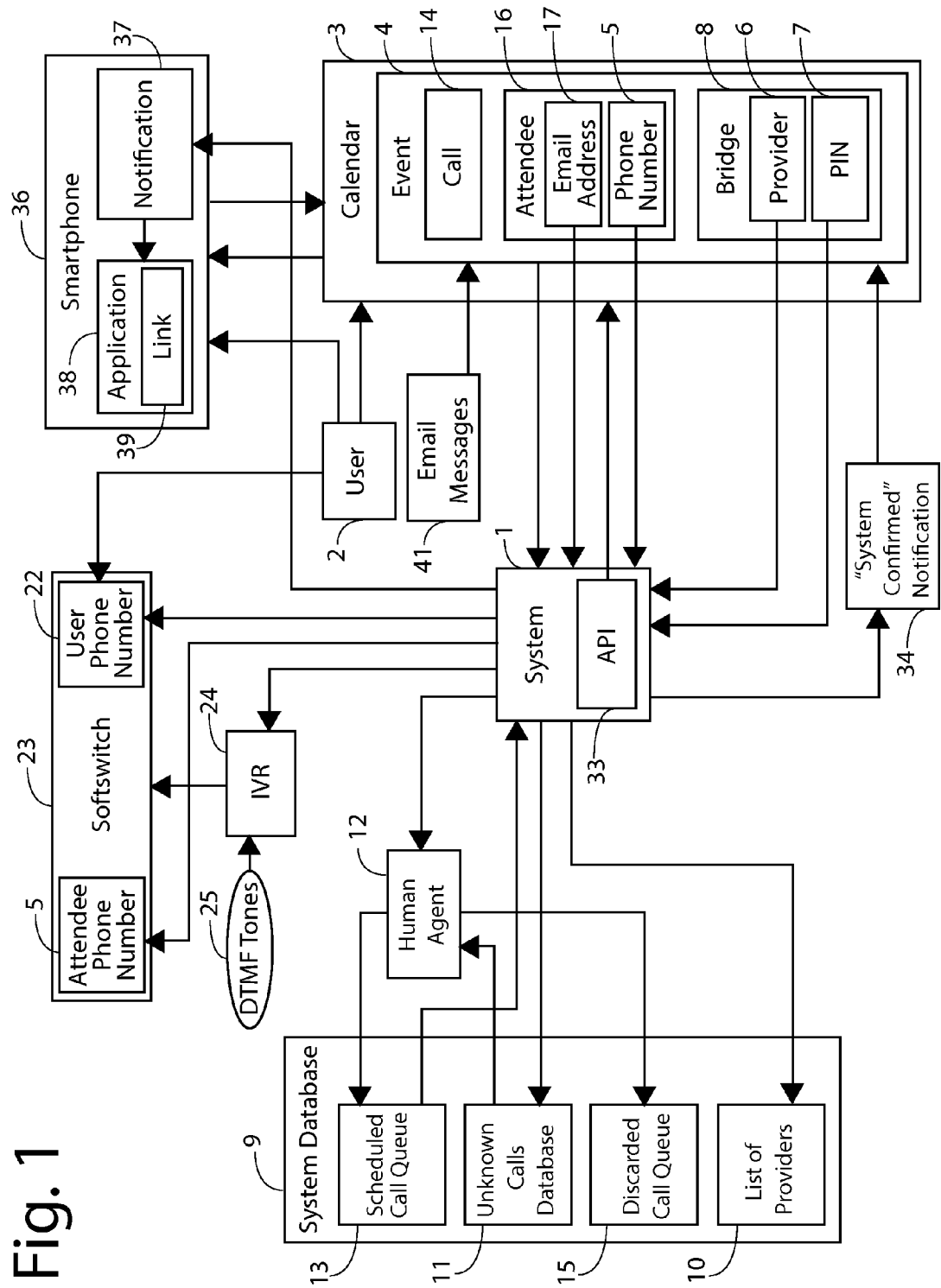
FIG. 1 is a view of the system according to an aspect of the present disclosure.

As shown in FIG. 1, the System 1 may be triggered once the initial User 2 grants the System 1 access to the cloud-based Calendar 3 of User 2 through the use of an API 33. API 33 may be attached to or embedded within System 1 and may have viral components. Once this occurs, the System 1 scans the Calendar 3 for Events 4. The User 2 also provides the System 1 with a User Phone Number 22 at which the User 2 can be contacted. At this time, User 2 can also provide the System 1 with conference call or telecom Provider 6 and PIN 7 if they manage a Bridge 8.

In one aspect of present disclosure, User 2 may install System Application 38 onto Smartphone 36. In this aspect, if User 2 has Calendar 3 linked with Smartphone 36, then Calendar 3 is capable of linking to Application 38. Once connected, Application 38 may send Notification 37 to User 2 through System 1 to Smartphone 36, alerting User 2 that Call 14 is starting. When Notification 37 is pushed, User 2 is directed to Application 38, where they may be presented with Link 39 which once clicked, launches the phone dialer using the constructed dial string. The System 1 acknowledges that the call was initiated through the Application 38, and creates DTMF Tones 25 compatible specifically for Smartphone 36. Once acceptable DTMF Tones 25 are placed into the IVR 24, then User Phone Number 22 is placed into Smart Devices network carrier (not shown) and dialed automatically along with Scanned Phone Number 5 to initiate Call 14 within Event 4.

When the System 1 detects an Event 4, the System 1 may attach a "System Confirmed" Notification 34 to the Event 4's title within the Calendar 3. The System 1 scans Event 4 for Attendee Phone Numbers 5, Providers 6, PINs 7 and Email Addresses 17 of additional call Attendees 16 and cross references the results within the System Database's 9 List of Providers 10 to confirm matches if necessary. System 1 also seeks new information or other flags that may be Calls 14, i.e., phone numbers and/or VOIP services and corresponding usernames, e.g., Skype.

If one or more required items, e.g., Attendee Phone Number 5, PIN 7, and Provider 6 are missing, or are not recognized by the System Database 9, then the Event 4 may be filtered through an Unknown Calls Queue 11 that may be continually monitored by Human Agent 12 who may manually edit and adjust the Events 4. Human Agent 12 may be informed every time a new Event 4 is entered into the Unknown Calls Queue 11. Once Human Agent 12 finds the required information, they may manually edit the Call 14 so that pertinent call information matches the information in the List of Providers 10, then the call may be placed in a Scheduled Call Queue 13.

If some of the required items are not found by the Human Agent 12 (e.g. Attendee Phone Number 5, PIN 7) and/or Human Agent 12 confirms that the calendar Event 4 does not actually include a Call 14, then the calendar Event 4 may be placed in a Discarded Call Queue 15, but retained in the System Database 9 for future analytics.

Figure 2:
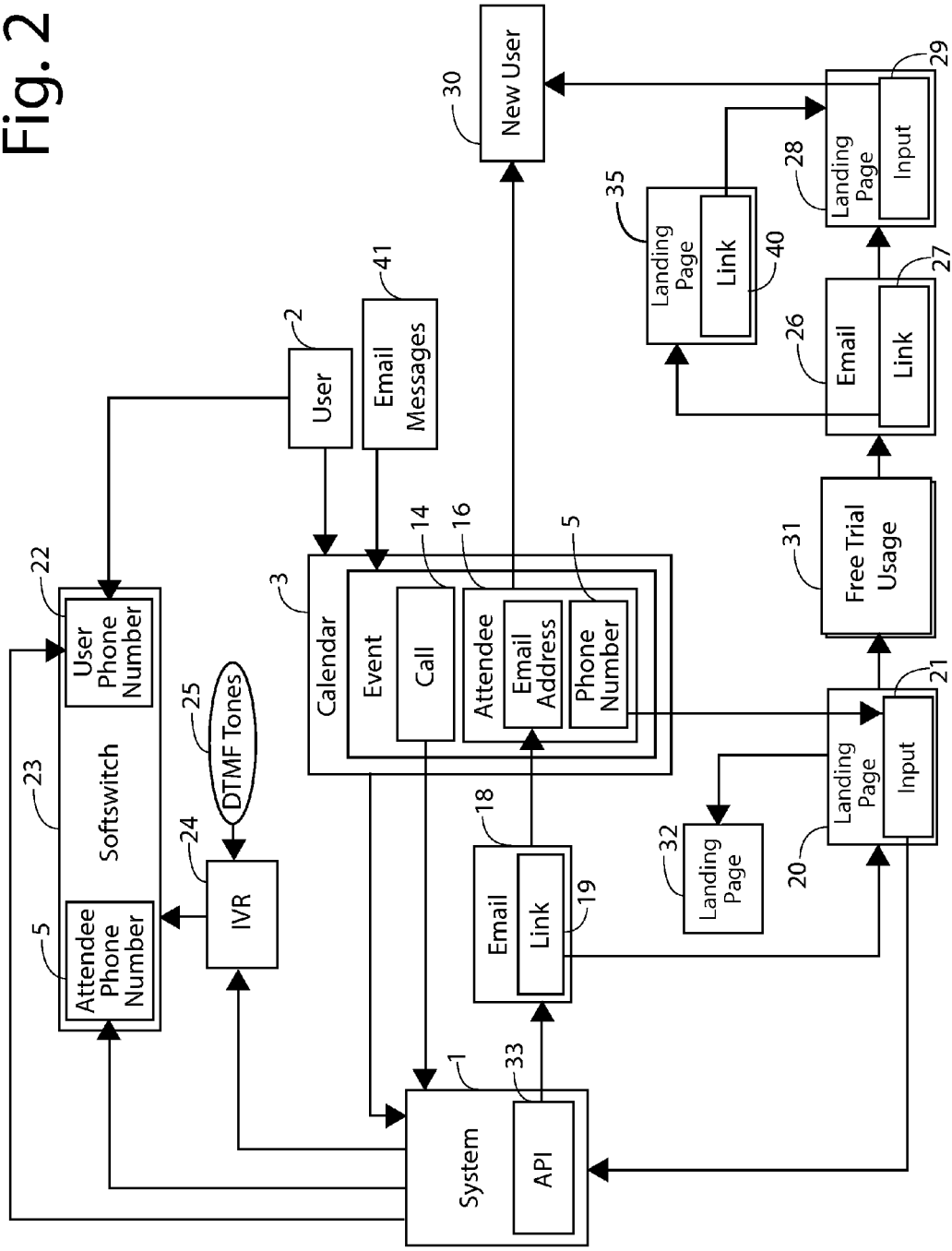
FIG. 2 is a view of the API system with viral behavior according to an aspect of the present disclosure.

FIG. 2 shows a view of the API 33. If System 1 recognizes additional Email Address(es) 17 of Attendee(s) 16 within Event 4, then API 33 may send Email 18 to additional Attendee(s) 16, Within Email 18 is Link 19, prompting the Attendee(s) 16 to sample the service by clicking on the Link 19, Once they have clicked on the Link 19, Attendee(s) 16 are directed to Landing Page 20 where they are offered to input their Attendee Phone Number 5 into Input 21. From there the Attendee(s) 16 are directed to Landing Page 32 confirming that they will be connected to Call 14 on time.

Before the time of the Call 14 the User 2 and those Attendee(s) 16 who provided the System 1 with their Attendee Phone Numbers 5 are placed into Softswitch 23. The Softswitch 23 is triggered to dial and bridge the User 2 and Attendee(s) 16 to the Provider 6, if necessary, at some designated time before the Call 14 is scheduled to begin and then connects them. If said Provider 6 requires a PIN 7, then the System 1 generates an IVR 24 that simulates the DTMF Tones 25 needed to bridge the User 2 to the Provider 7. DTMF Tones 25 may include PIN 7 plus any additional tones needed to confirm passcode entry, or to navigate potential audio menus. If the System 1 generates the IVR 24 successfully, then User 2 and Attendee(s) 16 will be placed into their scheduled Call 14 promptly on time.

Once Call 14 is finished, and/or Attendee(s) 16 have stayed on the Call 14 longer than some predetermined threshold, thus exhausting one of the Attendee(s) 16 Free Trial Usage(s) 31 then the Attendee(s) 16 is sent Email 26 by System 1. Within Email 26 is Link 27 offering Attendee(s) 16 a link to try the service. If Link 27 is clicked on, then Attendee(s) 16 are directed to Landing Page 28, providing Input 29 to sign up for the service. Once all pertinent information is successfully placed into Input 29, then Attendee(s) 16 become New User(s) 30.

If Attendee(s) 16 do not stay on Call 14 longer than the predetermined threshold, then Attendee(s) 16 does not exhaust one of their Free Trial Usage(s) 31. If Attendee(s) 16 does exhaust one of their Free Trial Usage(s) 31, and does not click on Link 27 within Email 26, then System 1 acknowledges that Attendee(s) 16 has exhausted one of their Free Trial Usage(s) 31. Once Attendee(s) 16 has exhausted all of their Free Trial Usage(s) 31 then they are directed to Landing Page 35, informing that they have exhausted all of their Free Trial Usage(s) 31. Within Landing Page 35 is Link 40, offering Attendee(s) 16 the option to sign up for the service. If Link 40 is clicked, then Attendee(s) 16 are directed to Landing Page 28, where they can place all pertinent information within Input 29 to sign up for the service. Once all pertinent information is successfully placed into Input 29, then Attendee(s) 16 become New User(s) 30.

Figure 3:
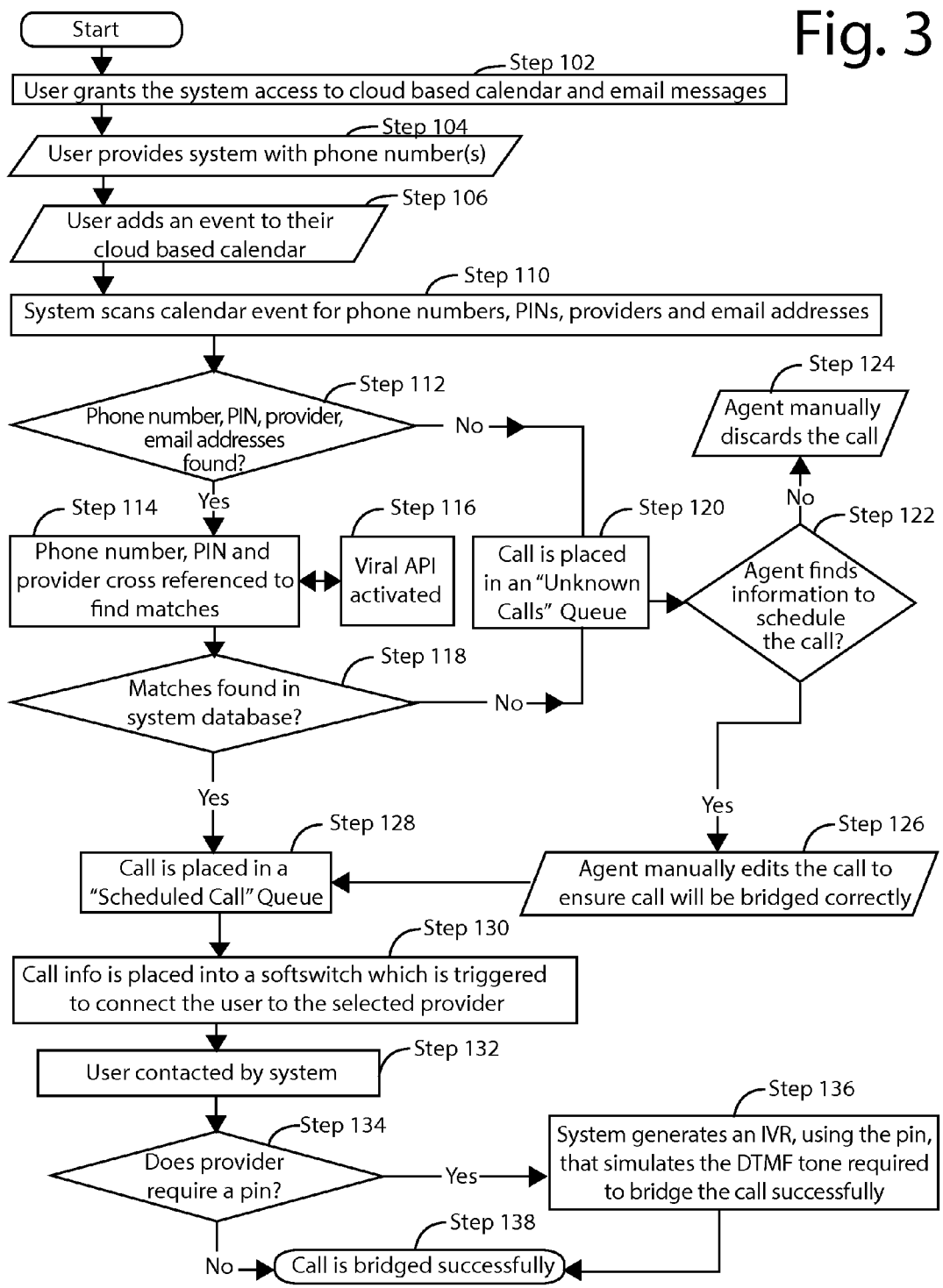
FIG. 3 is a flowchart of activity from the user's entry into the service according to an aspect of present disclosure.

FIG. 3 is a flowchart of activity from the user's entry into the service and completion of the service according to an aspect of present disclosure. At Step 102, the User 2 provides System 1 with access to the Calendar 3 and/or Email Messages 41, which may be located on the user's computer or located remotely, for example, accessible in a network and/or the cloud. At Step 104, the User 2 provides a User Phone Number 22 where the User 2 wishes to receive calls. User 2 may provide the System 1 with a conference call number or telecom Provider 6 and PIN 7 whereby User 2 may be contacted. If the Call 14, between User 2 and Attendee(s) 16, is not a direct call from Attendee Phone Number 5 to User Phone Number 22, then an IVR 24 and DTMF Tones 25 may be used by System 1 to automate the process of bridging calls within a Conference Bridge 8. At Step 106, User adds an Event 4 to Calendar 3 or receives an Email Message 41 containing call information, this information may be updated automatically. Updates may include synchronizing with User 2's calendar Events 4 or Email Messages 41 and may occur at predetermined times or intervals or when an Event 4 is created or changes. In one example, when an applicable Event 4 is added to the User 2's Calendar 3, the System 1 collects Event 4 data, then may attach a Notification 34 to the User 2's Event 4, e.g., appending "System Confirmed" to the title, in Calendar 3. System 1 may attach Notification 34 at the time of collection and/or after the Event 4 is fully or partially processed by System 1.

At Step 110, the System 1 scans the user's calendar Events 4 for information relating to upcoming Calls 14, such as User Phone Numbers 22, passcodes or PINs 7 for conference calls, and identity of telecom Providers 6 and places the data in System Database 9. The System 1 also scans for references to call-related software, such as Skype and corresponding user names as well as Email Addresses 17 of Attendees 16. In a similar manner, System 1 may scan Email Messages 41 for those containing Events 4 or information regarding upcoming Calls 14. If the System 1 finds such information at Step 112, then at Step 114, the System 1 determines whether the information matches data, such as Attendee Phone Number 5, passcode or PIN 7, and/or Provider 6 stored in the System Database 9. If matches are found, that data may have been used to connect a prior call and generate a prior IVR 24, which the System 1 may now use to connect User 2 to the current Call 14. Certain information may be determined to be required, e.g., based on experience with past calls, to create a call Event 4, which may include Attendee Phone Number 5, passcode or PIN 7, or Provider 6. For example, when the Call 14 is a direct call between two individuals, then the information needed may be an Attendee Phone Number 5. If the Call 14 is bridging an individual into a conference bridge, then the conference bridge phone number and optional PIN or passcode may be required to bridge the call successfully. In one aspect, the System 1 may determine that information regarding Event 4 is similar to or the same as existing information stored in Database 9. For example, Event 4 may be associated with or held by a vendor for which information is stored in Database 9. If the System 1 determines that additional steps are needed to connect, for example, requiring the caller to state their name or press certain buttons, then, as described below, the System 1 may generate audio using text-to-voice or DTMF tones to navigate those additional steps.

If one or more required items are missing or are not recognized by the System Database 9 or upon an error condition, (No, Step 112) then at Step 120 the Event 4 may be sent to an Unknown Calls Database 11 that may be monitored by a Human Agent 12. Human Agent 12 then finds the appropriate information to schedule the Call 14 in Step 122. By retrieving said data within Event 4 and System Database 9 (Yes, Step 122), Human Agent 12 may ensure Call 14 will be bridged correctly in Step 126, e.g., by manually editing information. If the Human Agent 12 does not find any of the pertinent information and/or determines that Event 4 is not a Call 14 (No, Step 122), then at Step 124 the Human Agent 12 may discard the Call 14 or may take additional steps such as contacting the User 2.

System 1 finds Email Address(es) 17 of Attendee(s) 16 (Yes, Step 112). Then Attendee Phone Number 5, passcode or PIN 7 and Provider 6 found are cross-referenced to find matches in System Database 9 in Step 114. In Step 116 these Email Addresse(s) 17, found during Step 110 are sent Email(s) 18 through the System 1 API 33 to capture New User(s) 30.

Once all pertinent data is matched from System Database 9 and Event 4 (Yes, Step 118 or after Step 126), the Call 14 is placed in Scheduled Call Queue 13 at Step 128. At Step 130, the Call 14 is placed into a Softswitch 23 which is triggered at the time of the Event 4, or triggered at a time prior to the Call 14, based on the conference call provider and stored knowledge of Provider 6, to connect the User 2 to the selected Provider 6.

User 2 is then contacted by System 1 at Step 132. If the Provider 6 does not require input, e.g., PIN 7 at Step 134, then the System 1 bridges the call successfully at Step 138 If the Provider 6 requires a PIN 7, then at Step 136 System 1 generates an IVR 24, using PIN 7, that simulates the DTMF Tones 25 required to bridge the Call 14 successfully. System 1 may contact User 2, to join User 2 to Call 14. For example, System 1 may place a call to User 2 on Smartphone 36, whereupon User 2 may be prompted to join Call 14, such as by pressing a specific key on their phone. In other aspects, System 1 may contact User 2 via email or other messaging platform, such as SMS or MMS, and provide instructions regarding how to join or the ability to join Call 14. As described below, in other aspects System 1 may communicate with an application resident on Smartphone 36 to facilitate User 2 joining Call 14.

At Step 138, User 2 joins the Call 14, then Call 14 is bridged successfully. User 2 may also be prompted in other ways to join the Call 14, such as voice recognition. If the conference call software requires the user to state their name before connecting to the call, User 2 may be prompted to provide System 1 with a recording stating the User's name, or System 1 may convert User 2's name using text-to-speech software. This recording may be stored in the Database 9, retrieved and placed into the IVR 24 at the time of the Call 14. Alternatively, System 1 may attempt to skip the voice recognition within the IVR 24 by placing a pause or sound into the DTMF Tones 25. If IVR 24 is not approved, then Human Agent 12 may manually record and provide the name of the User 2 during the IVR process, ensuring User 2 is automatically bridged into their scheduled Call 14. If the process requires speech, and the bridging is not handled by software, but rather a human, then the Human Agent 12 may be placed into the call, provides the name of the User 2 manually, and once connected, manually connects User 2 to the scheduled Call 14.

Figure 4:
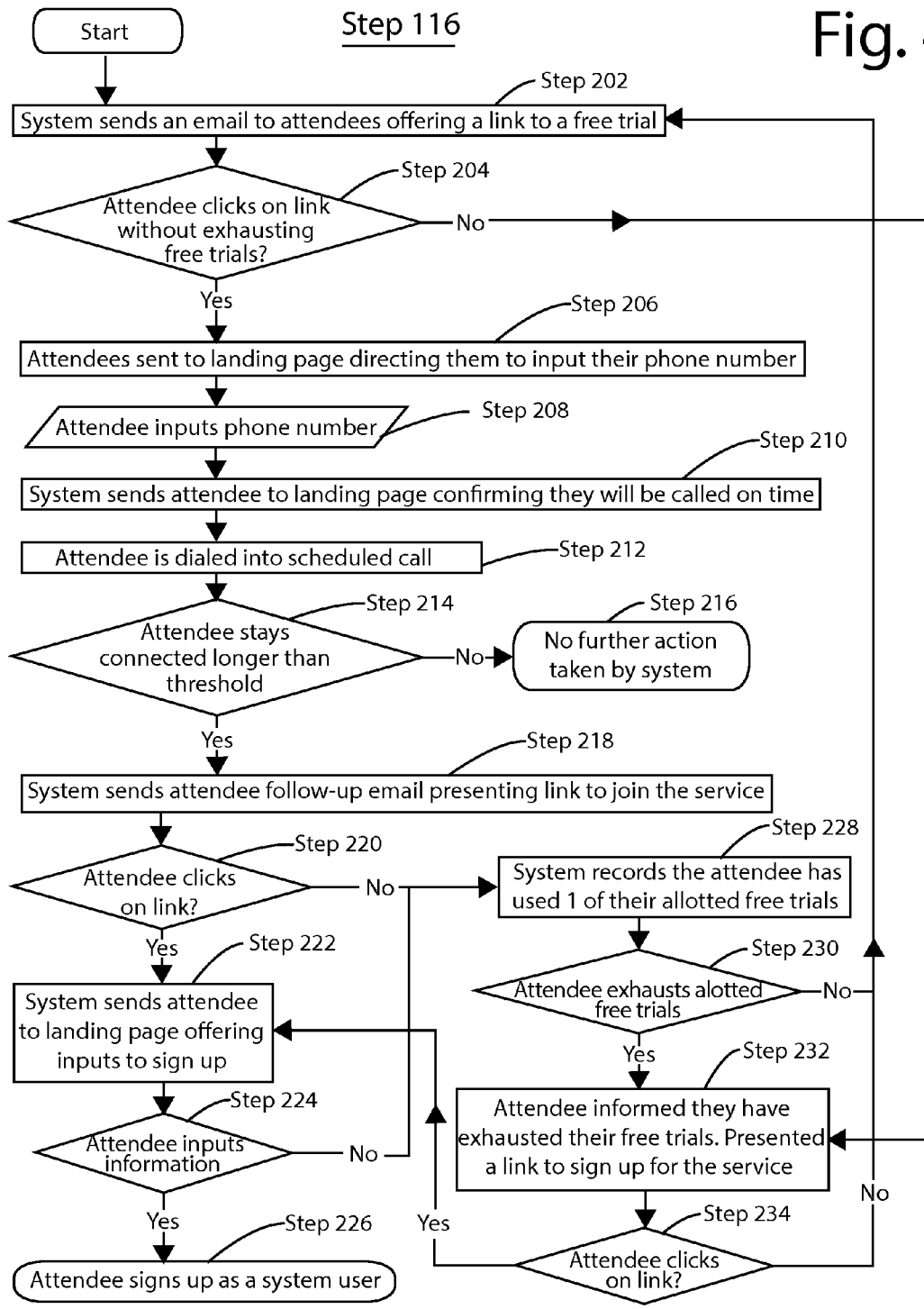
FIG. 4 is a flowchart of activity of the viral API to acquire users according to an aspect of present disclosure.

FIG. 4 details the processes involved in capturing additional users for the service using an API 33 and is labeled as Step 116, This API 33 may be a viral mechanism triggered as a result of System 1 finding all data needed to set up the Call 14, including, the Email Address(es) 17 of Attendee(s) 16 in Step 112. At Step 202 when System 1 sends an Email 18 to the Email Address(es) 17 of Attendee(s) 16 offering a Link 19 to Free Trial Usage 31. If this is one of the first predetermined number of a total predetermined number of usages granted by the System 1, Attendee 16 clicks on Link 19 without exhausting Free Trial Usages 31 at Step 204, then they are sent to Landing Page. 20 in Step 206, which directs Attendee 16 to put their Attendee Phone Number 5 into Input 21. When Attendee(s) 16 puts their Attendee Phone Number(s) 5 into Input 21 at Step 208, then System 1 sends Attendee(s) 16 to Landing Page 32 at Step 210 confirming that the Attendee(s) 16 will be called on time. At Step 212 Attendee(s) 16 is dialed into scheduled Call 14, thus using one of Attendee 16's Free Trial Usages 31. At Step 214, if Attendee(s) 16 does not stay connected to the Call 14 longer than the threshold required to use Free Trial Usage 31, then there is no further action taken by System 1 in Step 216. If Attendee(s) 16 stays connected to the Call 14 longer than the threshold required to use Free Trial Usage 31 during Step 214, then System 1 sends Attendee(s) 16 follow-up Email 26 during Step 218 presenting a Link 27 to join the service by allowing Attendee(s) 16 to go through the sign-up process.

If the Attendee(s) 16 do not click on the Link 27 during Step 220 and do not complete the sign-up process to join the service, then in Step 228 the System 1 records that the Attendee(s) 16 has used one of their allotted Free Trial Usages 31. If the Attendee(s) 16 has exhausted their allotted Free Trial Usages 31 at Step 230, then in Step 232 Attendee(s) 16 are sent to Landing Page 35 informing the Attendee(s) 16 that they have exceeded their number of Free Trial Usage(s) 31, Attendee(s) 16 are also offered Link 40 to sign up for the service. If the Attendee(s) 16 have not exhausted their predetermined number of Free Trial Usages 31, and they do not click on Link 40, then the Attendee(s) 16 may be able to repeat Step 116 and use the service over and over until they have exhausted their Free Usage Trials 31.

If the Attendee(s) 16 click on the Link 27 in Step 214 or Link 40 in Step 220 to join the service, then the System 1 sends Attendee(s) 16 to Landing Page 28 in Step 218 offering input 29 to sign up for the service. Once again, if the Attendee(s) 16 does not put in their information into Input 29, then System 1 records that the Attendee(s) 16 has used one of their allotted Free Usage Trials 31 in Step 216. If the Attendee(s) 16 do put their information into Input 29, then the Attendee(s) 16 successfully signs up for the service in Step 222, officially becoming New User 30.

Figure 5:
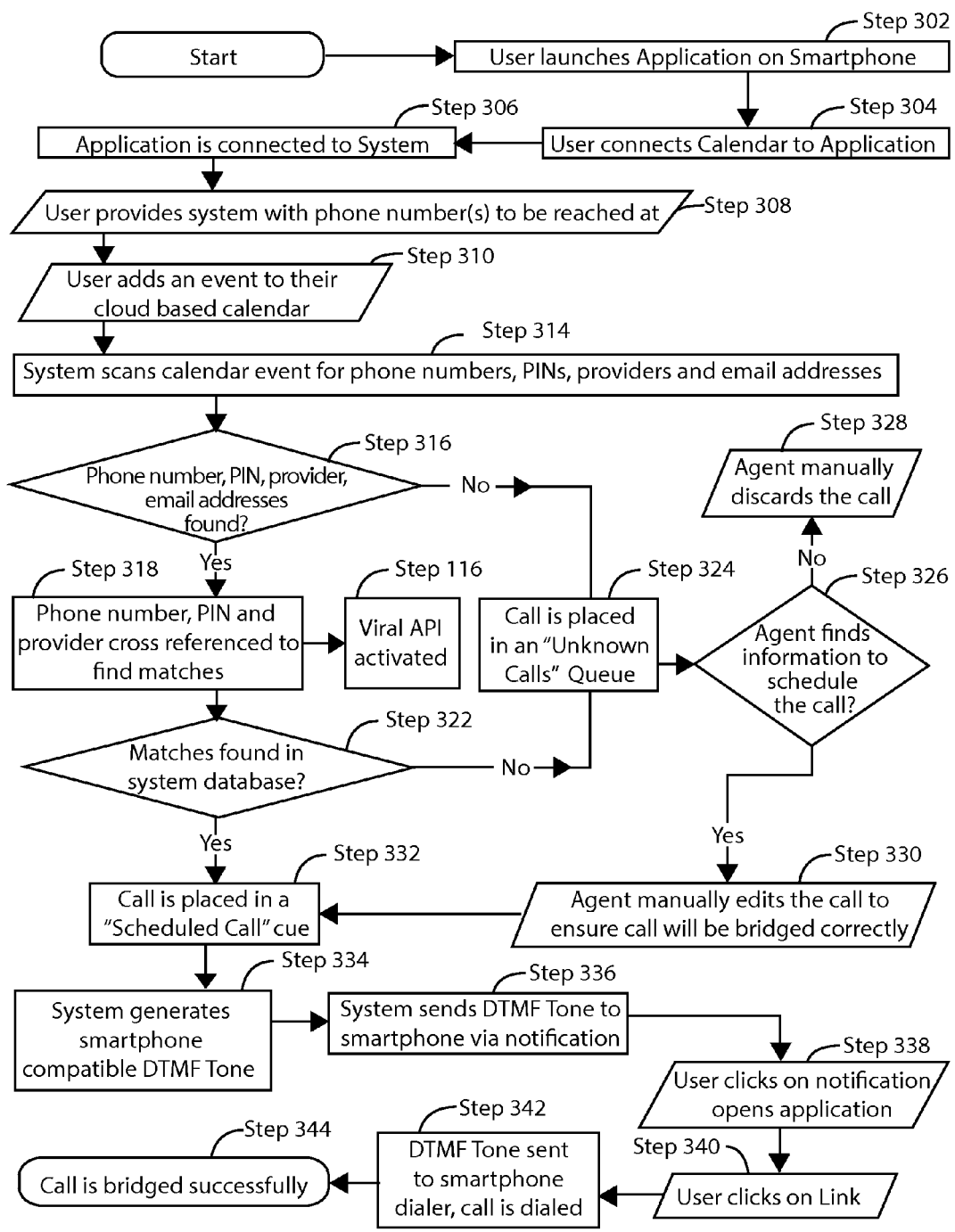
FIG. 5 is a flowchart of activity from the user's entry into the service application according to an aspect of present disclosure.

As shown, FIG. 5 is a flowchart of activity from the user's entry into the service using a smartphone application according to an aspect of present disclosure. At Step 302, the User 2 launches the service Application 38 on their Smartphone 36. At Step 304, User 2 connects Calendar 3, if already synced to User 2's Smartphone 36, to Application 38 to provide access to the user's Calendar 3 or email messages, and the Event(s) 4 located within. Once Calendar 3 or email messages are synced to System 1 and Application 38, then Application 38 is then connected to System 1 at Step 306. At Step 308, the User 2 provides a User Phone Number 22 where the User 2 wishes to receive calls. User 2 may also provide the System 1 with a conference call or telecom Provider 6 and PIN 7. If the call is not a direct call from Attendee Phone Number 5 to User Phone Number 22, then an IVR 24 and DTMF Tones 25 are used to automate the process of bridging calls within a Conference Bridge 8. At Step 310, User adds an Event 4 to their Calendar 3 and may be updated automatically. Updates may include synchronizing with User 2's calendar Events 4 or Email Messages 41 and may occur at predetermined times or intervals or when an Event 4 is created or changes. When an Event 4 is added to the User 2's Calendar 3, the System 1 collects Event 4 data, then may attach Notification 34 to the User 2's Event 4, e.g., appending a "System Confirmed" to the Event 4 title.

At Step 314, the System 1 scans the user's calendar Events 4 or email messages for information relating to upcoming Calls 14, such as Attendee Phone Numbers 5, passcodes or PINs 7 for conference calls, or identity of telecom Providers 6. The System 1 also scans for references to call-related software, such as Skype and corresponding user names as well as Email Addresses 17 of Attendees 16. If the System 1 finds such information at Step 316, then at Step 318, the System 1 determines whether the information matches information stored in the System Database 9. Certain information may be determined to be required to create a call Event 4, which may include Attendee Phone Number 5, passcode or PIN 7, or Provider 6. If System 1 finds Email Address(es) 17 of Attendee(s) 16, then in Step 116 these Email Addresse(s) 17 are sent Email(s) 18 through the System 1's API 33 to capture New User(s) 30.

If one or more required items are missing or are not recognized by the System Database 9, then the Event 4 may be sent to an Unknown Calls Database 11 at Step 324 that may be monitored by Human Agent 12 who may manually create or edit the Event 4 in Step 326 by retrieving said data within Event 4 and System Database 9 and then placing the call in Scheduled Call Queue 13. If the Human Agent 12 does not find some or all of the pertinent information and deciphers that Event 4 is not a Call 14, then at Step 328 the Human Agent 12 manually discards the call. If System 1 finds Email Address(es) 17 of Attendee(s) 16, then in Step 116 these Email Addresse(s) 17 are sent Email(s) 18 through the System 1's API 33 to capture New User(s) 30.

Human Agent 12 manually edits the call information to ensure the call will be bridged correctly at Step 330. Once all pertinent data is matched from System Database 9 and Event 4, the Call 14 is placed in Scheduled Call Queue 13 at Step 332. Prior to Call 14, System 1 may generates a compatible DTMF Tone 25, or related information allowing Smartphone 36 to generate compatible DTMF Tone 25, for Smartphone 36 in Step 334. In Step 336 System 1 sends the DTMF Tone 25 or related information to Smartphone 36 via Notification 37. User 2 taps on Notification 37 which then launches Application 38 on Smartphone 36 in Step 338. Application 38 presents User 2 with prompt to Link 39. By clicking on Link 39 within Application 38, User 2 can dial into the scheduled Call 14 via Link 39 at their own discretion, rather than being bridged by System 1 at the exact time of Call 14. Once Link 39 is clicked in Step 340, Application 38 sends the DTMF Tone 25 to Smartphone 36's dialer, and the Call 14 is dialed during Step 342. At Step 344 the User 2 is placed using Smartphone 36's service provider which connects the User 2 to the selected Provider 6. Once the User 2 is connected to Provider 6, then Call 14 is bridged successfully at Step 344.

Figure 6:
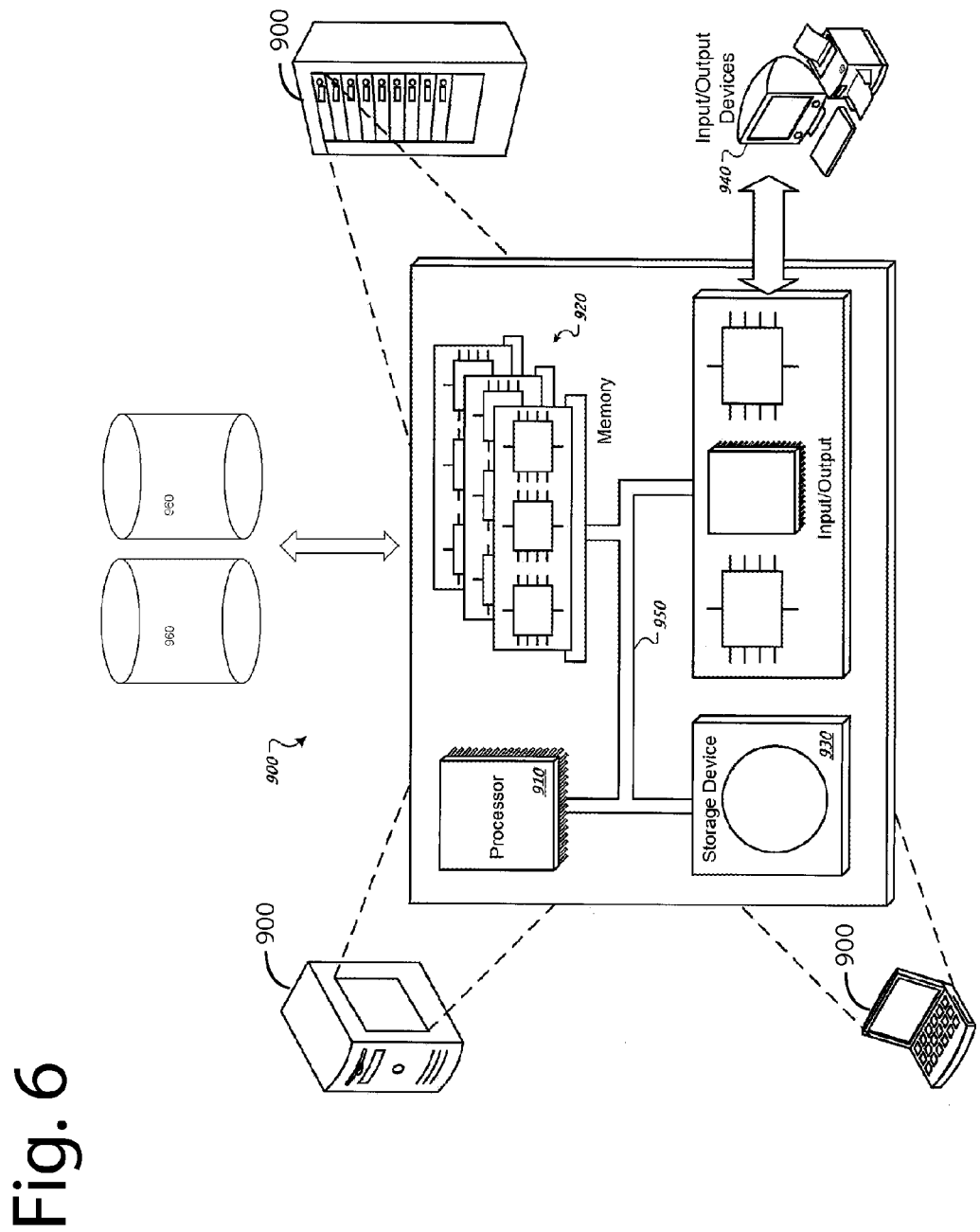
FIG. 6 is a diagram displaying a general purpose computer on which the system and method of the present disclosure may be implemented according to an aspect of present disclosure.

FIG. 6 shows a general purpose computer on which the system and method of the present disclosure may be implemented. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or non-volatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data, such as financial data, may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and, one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end, component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

Numerous additional modifications and variations of the present disclosure are possible in view of the above teachings. It is therefore to be understood that within the scope of the appended claims, the present disclosure may be practiced other than as specifically described herein.

Persons having skill in the art will realize that the invention can be adapted beyond the specific steps and interface elements set forth herein, and that small variations in method steps, user interfaces, or other aspects of the invention, including omission of certain method steps, can be immaterial. Persons having skill in the art will realize that the invention can be practiced with a general purpose computer instead of a touch screen portable device without deviating from the scope of the invention.

What is claimed is:

1. A computer system for connecting a user to a scheduled call, comprising:
a processor in communication with non-volatile memory, the non-volatile memory comprising:

code for receiving a user phone number where the user may be contacted and information allowing access to the user's calendar or email;

code for accessing the user's calendar or email and identifying the scheduled call in the user's calendar or email, the scheduled call having information including at least a scheduled call number and a scheduled call time;

code for placing a call to the scheduled call number before the scheduled call time;

code for placing a call to the user at the user phone number before the scheduled call time;

code for confirming the user has answered the call to the user; and code for connecting the call to the user to the call to the scheduled call number.

2. The system of claim 1, wherein the scheduled call information further includes one or more scheduled call access codes, and wherein code for placing the call to the scheduled call number further includes transmitting sounds corresponding to the scheduled call access codes.

3. The system of claim 1, further comprising:

code for identifying one or more characteristics of the scheduled call including a provider associated with the scheduled call;

code for accessing a database storing requirements of the provider; and wherein code for placing the call to the scheduled call number further includes transmitting sounds based on the requirements of the provider.

4. The system of claim 3, wherein the sounds include one or more of DTMF tones and text-to-speech.

5. The system of claim 1, further comprising:

code for prompting the user to state their name, recording the user's name, and transmitting the recorded user's name in response to a prompt when placing the call to the scheduled call number.

6. The system of claim 1, further comprising:

code for updating the user's calendar to include a notifier indicating the scheduled call has been identified.

7. The system of claim 1, further comprising:

code for notifying the user that the scheduled call has been identified.

8. A computer system for connecting a user to a scheduled call, comprising:

a processor in communication with non-volatile memory, the non-volatile memory comprising:

code for receiving user information and information allowing access to the user's calendar or email;

code for accessing the user's calendar or email and identifying the scheduled call in the user's calendar or email, the scheduled call having information including at least a scheduled call number and a scheduled call time;

code for placing a call to the scheduled call number before the scheduled call time; and code for receiving a call from the user and connecting the call from the user to the call to the scheduled call number.

9. The system of claim 8, wherein the scheduled call information further includes one or more scheduled call access codes, and wherein code for placing the call to the scheduled call number further includes transmitting sounds corresponding to the scheduled call access codes.

10. The system of claim 8, further comprising:

code for identifying one or more characteristics of the scheduled call including a provider associated with the scheduled call;

code for accessing a database storing requirements of the provider; and wherein code for placing the call to the scheduled call number further includes transmitting sounds based on the requirements of the provider.

\* \* \* \* \*